OSCAR C. HOLDERER,
INVENTOR.

May 11, 1965
O. C. HOLDERER
3,182,496
ELECTRIC ARC DRIVEN WIND TUNNEL
Filed Dec. 12, 1961
2 Sheets-Sheet 2
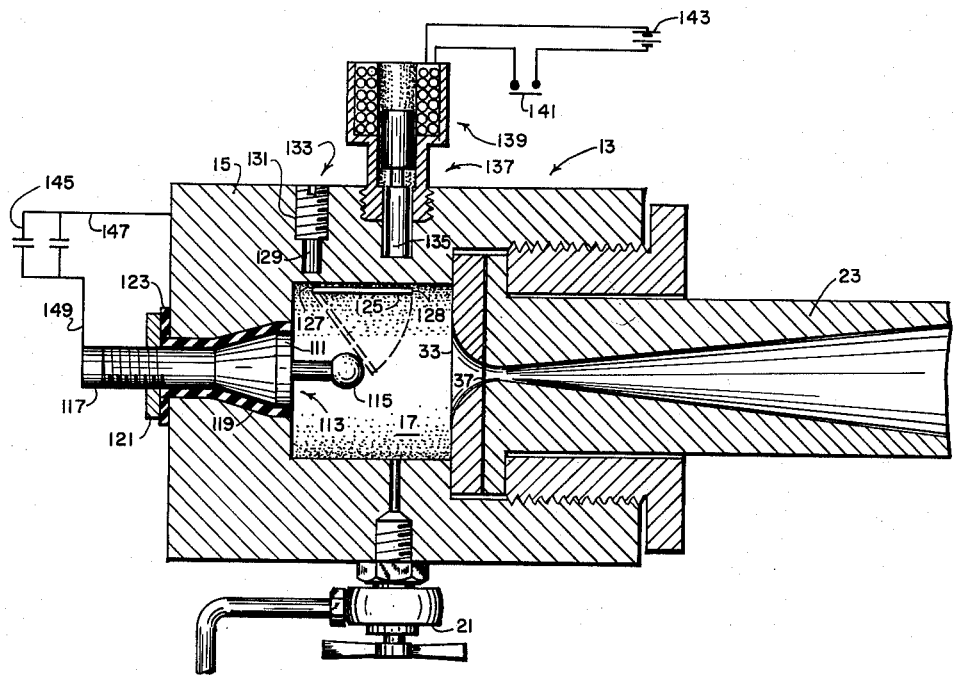
FIG. 2
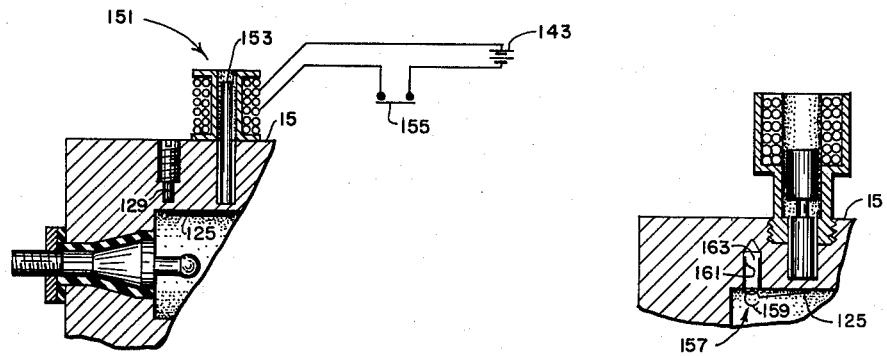
FIG. 3
FIG. 4
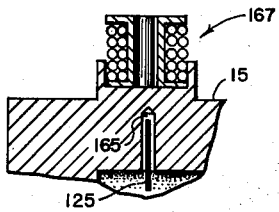
FIG. 5
OSCAR C. HOLDERER,
INVENTOR.
BY
ATTORNEYS

United States Patent Office 3,182,496
Patented May 11, 1965

3,182,496
ELECTRIC ARC DRIVEN WIND TUNNEL
Oscar C. Holderer, Huntsville, Ala., assignor to the United States of America as represented by the Administrator of the National Aeronautics and Space Administration
Filed Dec. 12, 1961, Ser. No. 158,914
12 Claims. (Cl. 73—147)
(Granted under Title 35, U.S. Code (1952), sec. 266)

The invention described herein may be manufactured and used by or for the Government of the United States of America for governmental purposes without the payment of any royalties thereon or therefor.

This invention relates to electric arc driven wind tunnels and more particularly to an arc triggering system for an electric arc driven wind tunnel.

Continuous flow wind tunnels have serious limitations regarding the highest feasible Mach number which can be produced by them with correct simulation of the condition of the gas passing over the test model. A practical upper speed limit for the conventional wind tunnel is about Mach numbers eight to ten. The increased interest for the study of flow phenomena in velocity ranges above this limit has led to the development of electric arc driven impulse wind tunnels which are colloquially often referred to as "Hotshot" tunnels. In an electric arc driven impulse tunnel the test gas (for instance air) is pumped into a pressure tight chamber which is followed by an expansion nozzle of suitable contour to produce supersonic flow. The pressure chamber is initially sealed off from the expansion nozzle by means of a diaphragm just strong enough to permit the charging of the pressure chamber to some high initial pressure and at the same time to permit evacuation of the nozzle to a near vacuum. The test model is suspended in a test section at a station downstream of the throat of the nozzle where the gas flow will expand to the desired test values. After the desired pretest conditions are established, that is, after the test section is evacuated and the pressure chamber is charged to a desirable pressure level, an electric arc is discharged through the gas in the pressure chamber. Within a matter of microseconds the temperature and pressure of the gas in the pressure chamber rises in proportion to the amount of energy added from the electric arc. Not able to withstand the higher pressure, the diaphragm bursts instantly and the high pressure and high temperature gas rushes through the nozzle. The gas expands and accelerates as in a conventional supersonic wind tunnel and flows over the test model.

Heretofore, the problem of getting the arc initiated within the pressure chamber has been accomplished by two electrodes, having a tease wire fixed therebetween, which are charged to a high electrical potential, as illustrated in U.S. Patent 2,995,035 issued to D. E. Bloxom, Jr., et al. on August 8, 1961. However, such an arrangement is not necessarily desirable because of the bulkiness and complexity of the external high voltage switching equipment needed and the contamination of the gas from both the vaporized or ablated matter from the insulator surfaces of the electrodes and the gasified tease wire.

Accordingly, it is an object of the present invention to provide a simplified system of triggering an arc of an electric arc driven impulse tunnel.

Another object is to reduce the contamination of a gas within the pressure chamber of an electric arc driven impulse tunnel.

Other and further objects, uses, and advantages of the present invention will become apparent as the description proceeds.

In accordance with this invention an arc triggering system for an arc driven impulse wind tunnel is constructed in which an electrical potential is placed between one primary electrode and the housing wall of a pressure chamber and an actuating means is provided to obtain at the desired instant, without the use of bulky complex switching gear, a conductive path of ions between the primary electrode and the housing wall to initiate a hot spark discharge. In one example, the actuating means may take the form of a secondary electrode which is located adjacent the primary electrode so that a small spark may easily be struck between it and the primary electrode to ionize the surrounding gas which consequently forms a conductive path between the primary electrode and the housing wall to initiate the hot spark. In another example, the actuating means may consist of a thin metallic wire which is held to the inner surface of the housing wall and at the desired time is released to move into contact with the primary electrode to be instantly vaporized to form a conductive path of ions which initiates the hot spark.

This will be more readily understood by the following detailed description when taken together with the accompanying drawings in which:

FIGURE 2 is an elevation cross-sectional view of another improved pressure chamber portion of an arc driven wind tunnel, shown partly in full; and FIGURE 3 to 5 are partial elevation cross-sectional views of modifications of the improved pressure chamber portion of FIGURE 2, shown partly in full.

Figure 1:
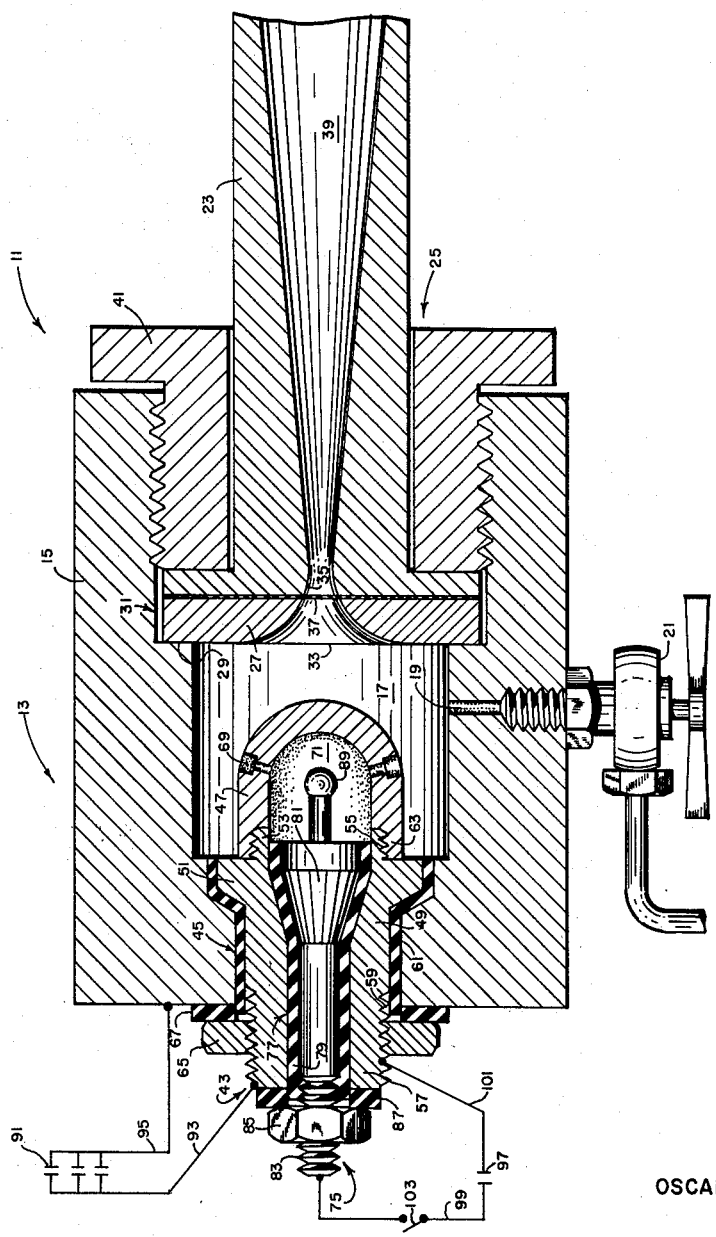
FIGURE 1 is an elevation cross-sectional view of an improved pressure chamber portion of an arc driven wind tunnel, shown partly in full.

Referring now to the drawings, there is shown in FIGURE 1 a pressure chamber or "bomb" portion 11 embodiment of an arc driven wind tunnel having a pressure vessel 13 with a housing wall 15 defining the outer limits of a chamber 17 for the containment of a test gas under high pressure. The gas is admitted to the chamber through an inlet 19 within the wall 15 which has a valve control 21. A De Laval nozzle 23 is inserted within an opening 25 within the wall 15 to form a discharge outlet for the test gas, and the nozzle 23 has a peripheral flange 27, adjacent its inlet 33, which fits tightly against an annular surface 29 of a countersunk bore 31 about the opening 25. The nozzle 23 is split between its inlet 33 and throat 35 and holds therebetween a rupturable diaphragm 37 which seals the chamber 17 from the expansion portion 39 of the nozzle 23 and which is of a material which will burst once the gas within the chamber 17 has reached a predetermined pressure. A tubular plug 41 in threaded contact with the inner surface of the countersunk bore 31 holds the split portions of the nozzle 23 and the diaphragm 37 sandwiched therebetween in a rigid relationship with the annular surface 29 of the countersunk bore 31.

A primary hollow electrode 43 extends through a hole 45 within the portion of the wall 15 opposite the nozzle inlet 33 whereby its hollow dome tip 47 is within the chamber 17. The hollow electrode 43 consists mainly of a tubular body section 49 which has a circumferential outer flange 51 which is countersunk about the opening of the hole 45 into the chamber 17. An inner portion 53 of the body section 49 which extends into the chamber has a threaded peripheral surface 55 and the opposite end portion 57 which projects outwardly from the outer surface of the wall 15 also has a threaded peripheral surface 59. To insulate the hollow electrode 43 from the wall 15, a sleeve 61 of suitable dielectric material surrounds the outer surface of the tubular body section 49 within the hole 45.

The hollow dome tip 47 has its circumferential edge 63 threaded and screwed onto the inner threaded end 53 of the tubular section 49 which projects into the chamber 17. A nut 65 is screwed onto the outer threaded end 57 of the tubular section 49 and it tightens the hollow electrode 43 to the housing wall 15. A washer 67 of suitable dielectric material 15 is located between the nut 65 and the wall 15.

The dome tip 47 is provided with a plurality of orifices 69 which are directed toward the inner surface of the wall 15 so that the hollow or enclosed space 71 of the dome tip 47 is in direct communication with the chamber 17.

A secondary electrode 75 fits within the tubular passageway 77 of the hollow electrode 43 and is insulated therefrom by a surrounding sleeve 79 of suitable dielectric material. As shown in FIGURE 1, the tubular passageway 77 is flared outwardly adjacent the chamber 17 and the secondary electrode 75 has an inner diverging portion 81 complementary to the flared portion in order that the hollow electrode 43 and the secondary electrode 75 may be easily tightened together from outside of the wall 15. For this purpose, the outer end portion 83 of the secondary electrode 75 projects beyond both the wall 15 and the outer end portion 57 of the hollow electrode 49 and is threaded for a nut 85 screwed thereon which securely fastens the secondary and primary electrodes 75 and 43 together. A washer 87 of dielectric material is placed between the nut 85 and the outer end 83 of the hollow electrode 43.

The inner end portion or tip 89 of the secondary electrode 75 extends into the hollow 71 of the dome tip 47 whereby it is in close proximity of the inner surface of the dome tip 47.

A series of electrical capacitors 91 in parallel relation and connected to two common terminals 93 and 95 form an electrical storage bank to produce the necessary electrical potential between the primary hollow electrode 43 and the wall 15 of the pressure vessel 13 to obtain a high energy spark at the instant an ion path is formed. Thus, one terminal 93 is connected to the primary electrode 43 and another terminal 95 is connected to the wall 15.

Also, a secondary electrical storage bank consisting of one or more electrical capacitors 97 connected to another pair of terminals 99 and 101 is provided to produce a low energy spark between the secondary electrode tip 89 and the dome tip 47 upon the closing of a switch 103. Thus, one terminal 101 is connected to the primary electrode 43 and the other terminal 99 is connected through the normally open switch 103 to the secondary electrode 75.

In operation of the embodiment of FIGURE 1, the chamber 17 is first filled with a gas, under high pressure, which cannot escape into the expansion portion 39 of the nozzle 23 because of the presence of the diaphragm 37. Also, during this time the expansion portion 39 of the nozzle 23 is evacuated of air and the capacitors 91 and 97 are electrically charged. Then, the switch 103 is closed causing a spark to strike between the secondary electrode tip 89 and the dome tip 47 which results in a rise of both the temperature and pressure of the gas within the hollow 71 of the dome tip 47 to the point it becomes highly dissociated and ionized. This ionized gas escapes through the orifices 69 within the dome tip 47 in strong jets against the inner surface of the housing wall 15 of the chamber 17. Since these jets of ionized gas are electrically conductive, multiple electrical paths are formed between the dome tip 47 and the wall 15 which allows multiple high energy sparks to jump therebetween. Coincidental with the discharge of the high energy sparks, the temperature and pressure of the gas within the chamber 17 rises and the diaphragm 37 bursts. The hot, high pressure gas escapes through the nozzle 23 where it expands and accelerates to the desired test conditions.

Another embodiment of the present invention is illustrated in FIGURE 2. In this instance a single electrode 111 is fitted through an inner converging passageway 113 within the housing wall 15 of the chamber 17 which is located across from the inlet 33 of the nozzle 23. The inner portion or tip end 115 of the electrode 111 extends into the chamber 17 and the outer end portion 117 is threaded and projects outwardly from the housing wall 15. A sleeve 119 of suitable dielectric material surrounds the middle portion of the electrode 111 within the passageway 113 and insulates the electrode 111 from the housing wall 15. A nut 121, screwed onto the outer threaded portion 117 of the electrode 111, holds the electrode 111 and wall 15 in tight engagement. A washer 123 of suitable dielectric material is located between the nut 121 and the wall 15.

Within the chamber and held by magnetic force to the inner surface of the wall 15 is a small ferromagnetic wire 125 which is adapted to swing, about its end 127 nearest the electrode 111, into contact with the electrode tip 115. This may be accomplished by having a small permanent bar magnet 129 fixedly held by a threaded portion 131 within a bore 133 in the upper portion of the wall 15 above the electrode 111 and another small permanent magnet bar 135 which is slidably held within a second bore 137 longitudinally spaced from the first bore 133 whereby each end 127 and 128 of the wire 125 is held and controlled by either the fixed magnet 129 or the slidable magnet 135. Secured to the slidable magnet 135 is a conventional solenoid 139 which when energized by the closing of a switch 141 pulls the slidable magnet 135 upwardly whereby its magnetic force on one end 128 of the wire 125 is insufficient to overcome the pull of gravity and the wire 125 is allowed to pivot about its other end 127, which is still being magnetically held to the wall 15, into contact with the electrode tip 115. The solenoid 139 is energized by a battery 143 in circuit relation with it and the switch 141.

A series of electrical capacitors 145 in parallel relation and connected to two common terminals 147 and 149 form an electrical storage bank to produce the necessary electrical potential between the electrode 111 and the wall 15 of the pressure vessel 13 to obtain a high energy spark at the instant an ion path is formed. Thus, one terminal 149 is connected to the electrode 111 and the other terminal 147 to the housing wall 15 of the chamber 17.

In operation of the embodiment of FIGURE 2, the switch 141 is closed allowing current from the battery 143 to energize the solenoid 139 and pull the slidable magnet 135 upward from the bottom of the bore 137 which results in the releasing of one end 128 of the wire 125 so that the wire 125 will swing, about its other end 127, into contact with the electrode tip 115. Upon contact with the electrode tip 115, the wire 125 is instantly vaporized from an electrical discharge which passes through it and, consequently, a path of vaporized metal ions is formed between the electrode tip 115 and the wall 15 which triggers the high energy spark discharge that results in the bursting of the diaphragm 37.

FIGURE 3 shows a slight modification of the embodiment of FIGURE 2 in which a stationary electromagnet 151 with a soft iron core 153 has replaced the slidable magnet 135 whereby merely opening the normally closed switch 155 will collapse the magnet's magnetic field and release the tease wire 125.

Another modification is illustrated in FIGURE 4 in which a mechanical hinge 157 replaces the fixed bar magnet 129. The mechanical hinge 157 consisting of a hooked end 159 for the tease wire 125 which is hooked onto a U-shaped wire 161 which is frictionally held within a bore 163 in the housing wall 15.

A further modification is illustrated in FIGURE 5 which shows the tease wire 125 suspended in a small bore 165 within the housing wall 15 and held by the magnetic force of an electromagnet 167. When the electromagnet 167 is de-energized, gravitational force will pull the wire 165 into contact with the electrode tip 115.

In the embodiments of the FIGURES 2 to 5, the pressure vessel or housing wall 15 or at least the portions in the vicinity of the magnets, should be made of nonmagnetic material.

It is apparent that a simplified system of triggering an arc of an electrical arc driven wind tunnel has been disclosed in which only a single primary insulated electrode is required because of the use of the pressure vessel wall as the second primary electrode, and the spark is initiated between the electrode and wall by a path of ions whereby the need of any external high voltage switching equipment is eliminated. In one example, the path of ions is formed by the use of a secondary electrode which although having an insulated surface exposed within the pressure vessel, still keeps the contamination of the gas low because the tease wire has been eliminated. In the other examples, while a tease wire is used, the contamination of the gas is kept low by the use of only a single electrode.

Obviously, many modifications and variations of the present invention are possible in the light of the above teachings. It is, therefore, to be understood that within the scope of the appended claims the invention may be practiced other than as specifically described.

What is claimed is:

1. In an arc driven wind tunnel having a housing wall defining the outer limits of a chamber, an expansion nozzle fitted through said wall, a rupturable diaphragm adjacent the inlet of said expansion nozzle, and a high pressure gas within said chamber; an improved arc triggering system comprising:
    (a) a single primary electrode comprising a tubular body section having a hollow dome tip on one end thereof;
        (1) said tubular body section extending through said wall and having its hollow dome tip within said chamber;
        (2) said hollow dome tip having a plurality of orifices which communicate said chamber with the hollow of said dome tip;
    (b) a secondary electrode fitted within said tubular body section and having an end tip extending into said hollow dome tip and spaced from the inner surface of said dome tip;
    (c) a series of electrical capacitors having two common terminals, one of said terminals being connected to said wall and the other to said primary electrode; and
    (d) a secondary capacitor having two terminals, one of which is connected through an opened switch to the secondary electrode and the other of which is connected to the primary electrode whereby closing said switch causes a spark to jump between said secondary electrode tip and the inner surface of said dome tip with the result that the gas within the hollow of said dome tip becomes dissociated and ionized and escapes through said orifices in said dome tip in strong jets against said wall and thus initiates high energy sparks between said dome tip and said wall.

2. In an arc driven wind tunnel having a housing wall defining the outer limits of a chamber, an expansion nozzle fitted through said wall, a rupturable diaphragm adjacent the inlet of said expansion nozzle, and a high pressure gas within said chamber, an improved arc triggering system; comprising:
    (a) a single primary electrode extending through said wall and into said chamber;
    (b) a tease wire;
    (c) means for holding said tease wire to the inner surface of said chamber adjacent said electrode and for releasing said wire whereby it will move into contact with the electrode tip; and
    (d) a series of electrical capacitors having two common terminals, one of said terminals being connected to said housing wall and the other to said primary electrode whereby when said wire comes into contact with said electrode tip it will be instantly vaporized from the electrical discharge through it and, consequently, a path of vaporized metal ions is formed between the electrode tip and said wall which triggers a high energy spark between said electrode tip and said wall which will raise the pressure and temperature of said gas within said chamber sufficiently to rupture said diaphragm and allow said gas to rush through said nozzle.

3. In an arc driven wind tunnel having a pressure vessel with an inner chamber, a discharge outlet for said chamber, a rupturable diaphragm sealing off said inner chamber from said discharge outlet, and a high pressure gas within said inner chamber, an improved arc triggering system; comprising:
    (a) a single primary electrode, having a tubular body portion joined to a hollow dome tip, supported within said chamber by said pressure vessel;
        (1) said hollow dome tip having an orifice for communicating the hollow of said dome tip with said chamber;
    (b) a secondary electrode fitted within said tubular body portion of said primary electrode and having an end tip within the hollow of said hollow dome tip;
    (c) a high energy storage means having two terminals,
        (1) one of said terminals being connected to said pressure vessel;
        (2) the other of said terminals being connected to said primary electrode; and
    (d) a secondary energy storage means having two terminals,
        (1) one of said terminals being connected to said primary electrode, and
        (2) the other of said terminals being connected to said secondary electrode.

4. In an arc driven wind tunnel having a pressure vessel with an inner chamber, a discharge outlet for said chamber, a rupturable diaphragm sealing off said inner chamber from said discharge outlet, and a high pressure gas within said chamber, an improved arc triggering system; comprising:
    (a) a primary electrode having an end tip supported within said chamber by said pressure vessel;
    (b) a secondary electrode having an end tip supported within said chamber by said pressure vessel;
    (c) said end tip of said secondary electrode being adjacent said end tip of said primary electrode;
    (d) a high energy storage means;
    (e) means for electrically connecting said high energy storage means to said primary electrode and to said pressure vessel;
    (f) a secondary energy storage means;
    (g) a switch; and
    (h) means for electrically connecting said secondary energy storage means through said switch to said primary electrode and to said secondary electrode whereby closing said switch causes a spark to jump between said end tip of said secondary electrode and said end tip of said primary electrode so that gas adjacent said spark becomes dissociated and ionized and forms a conductive path between said end tip of said primary electrode and said pressure vessel which triggers a high energy spark between said end tip of said primary electrode and said pressure vessel which causes the temperature and pressure of said gas within said pressure vessel to raise sufficiently to rupture said diaphragm and allow said gas to rush through said discharge outlet.

5. In an arc driven wind tunnel having a pressure vessel with an inner chamber, a discharge outlet for said chamber, a rupturable diaphragm sealing off said inner chamber from said discharge outlet, and a high pressure gas within said chamber; an improved arc triggering system; comprising:
- (a) a first electrode having an end tip supported within said chamber by said pressure vessel;
- (b) a second electrode having an end tip supported within said chamber by said pressure vessel;
- (c) said first electrode end tip being adjacent said second electrode end tip; and
- (d) means for supplying an electrical potential between said first electrode and said pressure vessel and said second electrode and said first electrode whereby a spark may jump between said first electrode end tip and said second electrode end tip causing gas adjacent said spark to ionize and form a conductive path between said first electrode tip and said pressure vessel which triggers a high energy spark between said first electrode tip and said pressure vessel which causes the pressure of said gas within said pressure vessel to rise sufficiently to rupture said diaphragm and allow said gas to rush through said discharge outlet.

6. An arc triggering system; comprising:
- (a) a vessel having an inner chamber;
- (b) a single primary electrode comprising a tubular body section having a hollow dome tip on one end thereof;
- (c) said tubular body section being supported by said vessel and having its dome tip within said chamber;
- (d) said hollow dome tip having a plurality of orifices which communicates said chamber with the hollow of said dome tip;
- (e) a secondary electrode fitted within said tubular body section and having an end tip extending into said hollow dome tip and spaced from the inner surface of said dome tip; and
- (f) means for supplying an electrical potential between said primary electrode and said secondary electrode and between said primary electrode and said vessel.

7. In an arc driven wind tunnel having a pressure vessel with an inner chamber, a discharge outlet for said chamber, a rupturable diaphragm sealing off said inner chamber from said discharge outlet, and a high pressure gas within said chamber, an improved arc triggering system, comprising:
- (a) an electrode supported within said chamber by said pressure vessel;
- (b) means for supplying an electrical potential between said electrode and said pressure vessel; and
- (c) actuating means having a tease wire movable from a position of non-contact with said electrode to a position of contact with said electrode and vessel to thereby complete the electrical circuit between said electrode and said pressure vessel;
- (d) said actuating means including:
    - (1) a hinge pivotally attaching one end of said tease wire to said pressure vessel; and
    - (2) means for magnetically holding the other end of said tease wire.

8. An arc triggering system, comprising:
- (a) a vessel having an inner chamber;
- (b) an electrode supported within said chamber by said vessel;
- (c) means for supplying an electrical potential between said electrode and said pressure vessel;
- (d) actuating means having a tease wire movable from a position of non-contact with said electrode to a position of contact with said electrode and vessel to thereby complete the electrical circuit between said electrode and said pressure vessel; and
- (e) said actuating means including:
    - (1) a hinge pivotally attaching one end of said tease wire to said vessel; and
    - (2) means for magnetically holding the other end of said tease wire.

9. In an arc driven wind tunnel having a pressure vessel with an inner chamber, a discharge outlet for said chamber, a rupturable diaphragm sealing off said inner chamber from said discharge outlet, and a high pressure gas within said inner chamber, an improved arc triggering system, comprising:
- (a) an electrode supported within said chamber by said pressure vessel;
- (b) means for supplying an electrical potential between said electrode and said pressure vessel;
- (c) a tease wire within said chamber; and
- (d) means for holding said tease wire solely in contact with said pressure vessel and for releasing said wire whereby it will move into a position of contact with said electrode and said vessel to thereby complete the electrical circuit between said electrode and said vessel;
- (e) said means for holding said tease wire including:
    - (a) a first magnet for magnetically holding one end of said tease wire, and
    - (b) a second movable magnet for magnetically holding the other end of said tease wire.

10. In an arc driven wind tunnel having a pressure vessel with an inner chamber, a discharge outlet for said chamber, a rupturable diaphragm sealing off said inner chamber from said discharge outlet, and a high pressure gas within said inner chamber, an improved arc triggering system, comprising:
- (a) an electrode supported within said chamber by said pressure vessel;
- (b) means for supplying an electrical potential between said electrode and said pressure vessel;
- (c) said pressure vessel having a small bore within the inner surface of said chamber above said electrode;
- (d) a tease wire within said chamber;
- (e) means for holding said tease wire solely in contact with said pressure vessel and for releasing said wire whereby it will move into a position of contact with said electrode and said vessel to thereby complete the electrical circuit between said electrode and said vessel;
- (f) said means for holding said tease wire being an electromagnet adapted to magnetically hold said tease wire within said bore until the electromagnet is de-energized to allow the wire to move into a position of contact with both said pressure vessel and said electrode.

11. An arc triggering system, comprising:
- (a) a vessel having an inner chamber;
- (b) an electrode supported within said chamber by said vessel;
- (c) means for supplying an electrical potential between said electrode and said pressure vessel;
- (d) a tease wire within said inner chamber; and
- (e) means for holding said tease wire solely in contact with said vessel and for later releasing said tease wire whereby it will move into a position of contact with both said electrode and said vessel to thereby complete the electrical circuit between said electrode and vessel;
- (f) said means for holding said tease wire including:
    - (a) a first magnet for magnetically holding one end of said tease wire, and
    - (b) a second movable magnet for magnetically holding the other end of said tease wire.

12. An arc triggering system, comprising:
- (a) a vessel having an inner chamber;
- (b) an electrode supported within said chamber by said vessel;
- (c) means for supplying an electrical potential between said electrode and said pressure vessel;
- (d) said pressure vessel having a small bore within the inner surface of said chamber above said electrode;
- (e) a tease wire within said chamber;

(f) means for holding said tease wire solely in contact with said pressure vessel and for releasing said wire whereby it will move into a position of contact with said electrode and said vessel to thereby complete the electrical circuit between said electrode and said vessel;

(g) said means for holding said tease wire being an electromagnet adapted to magnetically hold said tease wire within said core until the electromagnet is de-energized to allow the wire to move into a position of contact with both said pressure vessel and said electrode.

References Cited by the Examiner
UNITED STATES PATENTS

| 2,228,846 | 1/41 | Prince | 315—111 |
| 2,508,954 | 5/50 | Latour et al. | 315—111 |
| 2,765,975 | 10/56 | Lindenblad. | |
| 2,995,035 | 8/61 | Bloxsom et al. | 73—147 |
| 3,077,108 | 2/63 | Gage et al. | 73—147 |

RICHARD C. QUEISSER, *Primary Examiner.*

DAVID SCHONBERG, *Examiner.*